United States Patent
Lee et al.

(10) Patent No.: US 7,515,223 B2
(45) Date of Patent: Apr. 7, 2009

(54) DISPLAY APPARATUS AND LIGHT GUIDE PLATE THEREOF

(75) Inventors: Ta-Yuan Lee, Taipei (TW); Hsin-Che Hsieh, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 61 days.

(21) Appl. No.: 10/706,050

(22) Filed: Nov. 13, 2003

(65) Prior Publication Data

US 2004/0095522 A1    May 20, 2004

(30) Foreign Application Priority Data

Nov. 19, 2002    (TW) ............... 91133762 A

(51) Int. Cl.
*G02F 1/1335*  (2006.01)
*G09G 3/34*    (2006.01)
*G09G 3/36*    (2006.01)
*G09G 5/00*    (2006.01)
*F21V 7/04*    (2006.01)

(52) U.S. Cl. ............. 349/61; 349/62; 349/63; 349/65; 345/84; 345/102; 345/1.1; 345/1.3; 362/606; 362/607; 362/608; 362/611; 362/612; 362/613; 362/614; 362/615; 362/616; 362/617; 362/559; 362/560; 362/561

(58) Field of Classification Search ......... 349/61–63, 349/65; 345/84; 362/26–27, 29–30, 606–607, 362/611–617, 559–561, 31, 332
See application file for complete search history.

(56) References Cited

U.S. PATENT DOCUMENTS

| | | | | |
|---|---|---|---|---|
| 5,251,393 A | | 10/1993 | Gallone | 40/448 |
| 5,657,004 A | * | 8/1997 | Whittaker et al. | 340/815.45 |
| 5,704,703 A | * | 1/1998 | Yamada et al. | 362/27 |
| 6,496,236 B1 | * | 12/2002 | Cole et al. | 349/61 |
| 6,724,450 B1 | * | 4/2004 | Knoll et al. | 349/129 |
| 6,746,129 B2 | | 6/2004 | Ohkawa | 362/31 |
| 6,885,360 B2 | * | 4/2005 | Hara et al. | 345/102 |
| 7,016,701 B2 | * | 3/2006 | Colorado | 455/550.1 |
| 7,019,714 B2 | * | 3/2006 | Uchida et al. | 345/3.1 |
| 2003/0160919 A1 | * | 8/2003 | Suzuki et al. | 349/113 |
| 2003/0174262 A1 | * | 9/2003 | Sugawara et al. | 349/65 |
| 2004/0105251 A1 | * | 6/2004 | Yu et al. | 362/31 |
| 2004/0114396 A1 | * | 6/2004 | Kobayashi et al. | 362/561 |

FOREIGN PATENT DOCUMENTS

| | | | |
|---|---|---|---|
| JP | 2002006815 | * | 1/2002 |
| JP | 2002-122743 | | 4/2002 |

* cited by examiner

*Primary Examiner*—David Nelms
*Assistant Examiner*—Hoan C Nguyen

(57) ABSTRACT

A display apparatus includes a panel, a first light source, a second light source, a first light guide plate, a second light guide plate, and a processor. The panel includes a first area for displaying a first data and a second area for displaying a second data. The first light guide plate corresponding to the first area reflects the light provided by the first light source to the first area. The second light guide plate corresponding to the second area reflects the light provided by the second light source to the second area. The processor determines the states of the first light source and the second light source. The first or second light source is not operated all the time so as to conserve the power.

21 Claims, 2 Drawing Sheets

DISPLAY APPARATUS AND LIGHT GUIDE PLATE THEREOF

CROSS REFERENCE TO RELATED APPLICATIONS

This application claims priority to Taiwan Patent Application No. 091133762 entitled "Display Apparatus and Light Guide Unit thereof", filed Nov. 19, 2002.

FIELD OF INVENTION

The present invention generally relates to a display apparatus and, more particularly, to a liquid crystal display apparatus and a light guide plate thereof.

BACKGROUND OF THE INVENTION

The liquid crystal display (LCD) devices characterized by compact size and lighter weight are widely applied to various electronic devices, such as personal computers, laptop computers, mobile phones, and personal digital assistants. Take a transmission type LCD for example, the LCD device itself does not emit light, and therefore a separate light source is required to emit light. The light source, which irradiates the LCD device from the side opposite to the viewer with respect to an LCD panel, generally refers to a back light module.

The back light module generally includes a light guide plate and a spontaneous light source, such as a lamp or a light emitting diode. The light guide plate reflects and scatters light from the spontaneous light source, making the light become a uniform surface light, so that most of the lights from the lamp are uniformly incident to the LCD panel.

Conventionally, the light source of the back light module is always in an ON state of maximum brightness level during the operation of the LCD device. However, when only some regions of the LCD device are used to display data, activating the maximum brightness level of the light source to illuminate the entire display area becomes a waste of power. For example, when the mobile phone is in a standby mode or an idle mode, a user only needs to check the caller identification or the phone number shown in a small region with respect to the display area before receiving any incoming call. Therefore, keeping the light source at its maximum brightness level consumes much more power resulting in the shortening intervals between replacing batteries.

Therefore, there is a need to provide a display apparatus with less power consumption.

SUMMARY OF THE INVENTION

One aspect of the present invention is to provide a liquid crystal display apparatus with multiple light sources, and each light source is independently controlled based on its corresponding state to conserve power energy.

Another aspect of the present invention is to provide a light guide plate, which includes a light guide structure for guiding light toward a predetermined direction so as to produce lights in uniform intensity, minimize light interference, and prevent light leak.

In one embodiment, the present invention provides a liquid crystal display apparatus including a panel. The panel has a first area and a second area. The first area is configured to display first data like general communication information, such as time, battery status, phone number, caller identification, or communication status. Complicated data like image information, personalized graphics or sophisticated texts can be shown in the second area or both the second area and the first area.

A first light source, a second light source, a first light guide plate, and a second light guide plate are disposed opposite to the viewer side of the panel. The first light guide plate corresponds to the first area and guides light provided by the first light source to illuminate the first area. The second light guide plate corresponds to the second area and guides light provided by the second light source to illuminate the second area.

The first light guide plate further includes a light guide structure, such as a unidirectional groove. The groove defines a slanted surface, which is capable of reflecting and scattering light provided by the first light source, so that the light can uniformly illuminate the first area. Similarly, the second light guide plate also includes a light guide structure, such as a bi-directional groove to reflect and scatter light provided by the second light source, so that the light can uniformly illuminate the second area. In this embodiment, the liquid crystal display apparatus further includes a processor for determining states of the light sources, for example, ON state or OFF state, or the brightness level in the ON state.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
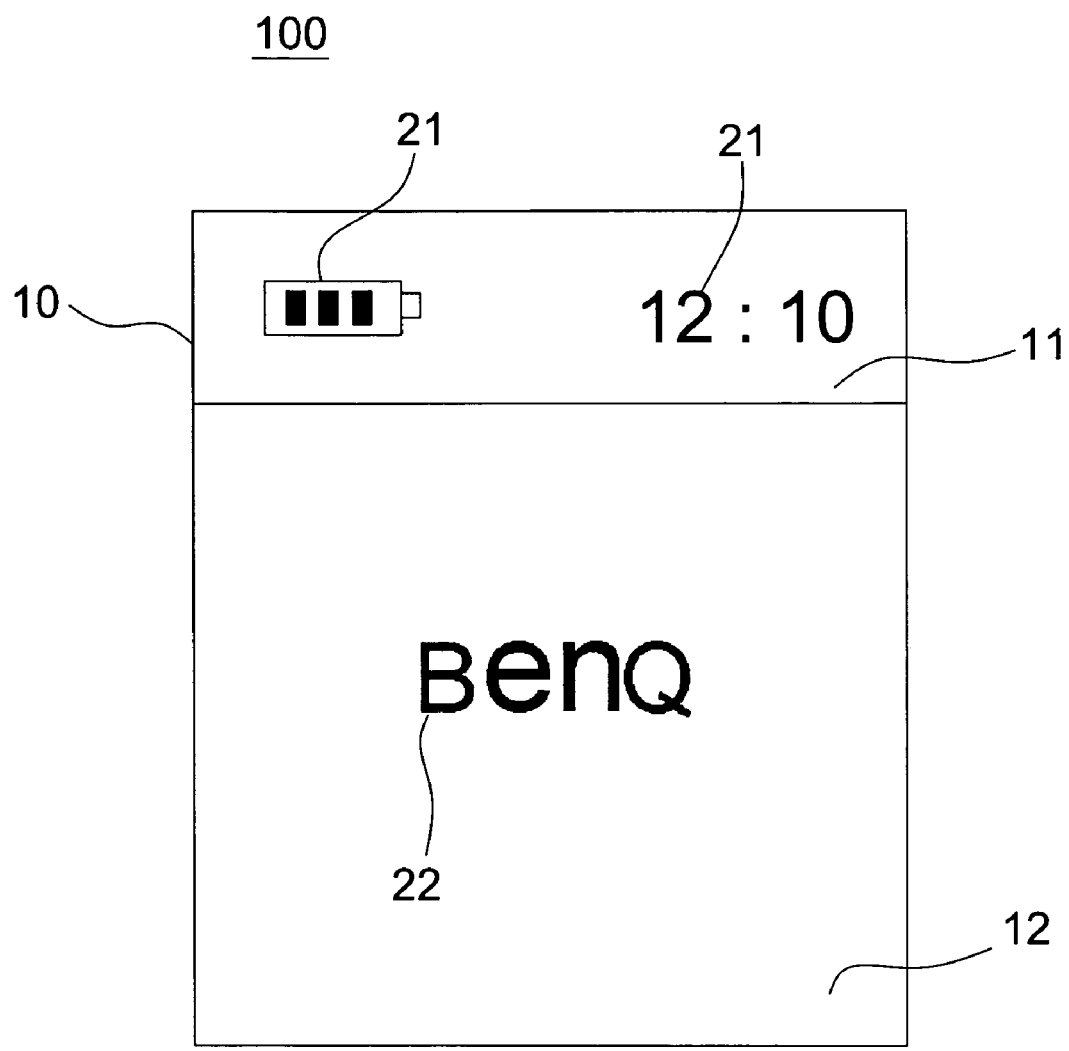
FIG. 1 illustrates a display apparatus in one embodiment of the present invention.

The present invention provides a display apparatus. In an exemplary embodiment, the display apparatus can be a liquid crystal display implemented in a mobile phone. Referring to FIG. 1, in one embodiment, a display apparatus 100 includes a panel 10, which has a first area 11 and a second area 12. The first area 11 is configured to display first data 21. The second area 12 is configured to display second data 22. For example, the first data 21 can be general communication information, such as time, battery status, phone number, caller ID, or communication status. The second data 22 can be image information, such as received images, personalized graphics or texts.

Figure 2:
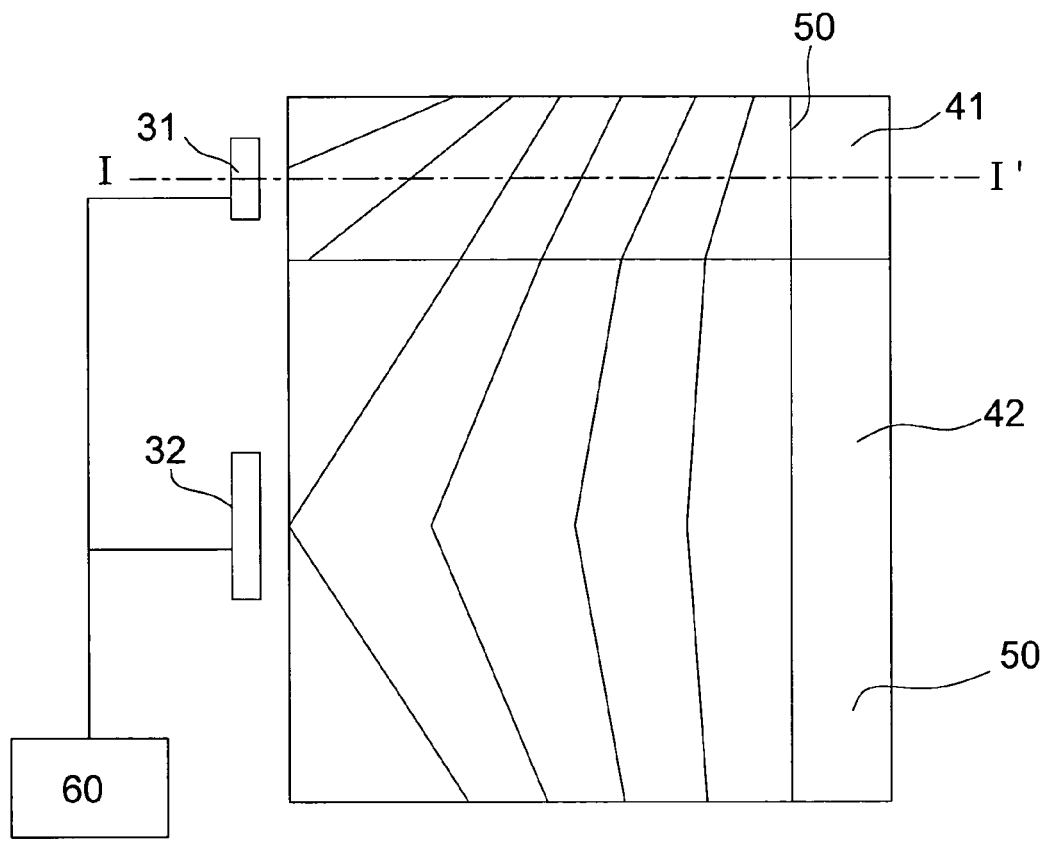
FIG. 2 illustrates a schematic view of light sources and an exemplary light guide plate of the present invention.

As shown in FIG. 2, the display apparatus 100 further includes a first light source 31, a second light source 32, a first light guide plate 41, and a second light guide plate 42. The light sources 31 and 32 and the light guide plates 41 and 42 are disposed behind the panel 10, i.e. opposite to the viewer side with respect to the panel 10. The light sources 31 and 32 serve as back light sources. The first light guide plate 41 corresponds to the first area 11, and is configured to reflect and scatter light provided by the first light source 31, so that the light can uniformly illuminate the first area 11. The second light guide plate 42 corresponds to the second area 12, and is configured to reflect and scatter light provided by the second light source 32, so that the light can uniformly illuminate the second area 12.

The light guide plate 41 further includes a light guide structure 50, such as a groove, so as to more uniformly reflect and scatter light provided by the first light source 31 to the first area 11. Lines shown in FIG. 2 represent the distribution of light guide structures in the light guide plates 41 and 42. In this embodiment, the light guide structure 50 of the first light guide plate 41 is a unidirectional groove. The groove defines a slanted surface so as to guide light toward the first area 11 including the corner. Therefore, when the first light source 31 is turned on, the light reflected and scattered by the first light guide plate 41 becomes a surface light source, which uniformly illuminates the first area 11. Furthermore, the second light guide plate 42 also includes light guide structures 50 like bi-directional grooves or grooves of V pattern. The bi-directional grooves reflect and scatter light provided by the second light source 32, so that the light uniformly illuminates the second area 12.

Moreover, in response to different design needs, the light guide structure 50 of the first light guide plate 41 can be designed to guide light toward a predetermined direction. As shown in FIG. 2, the light guide structure 50 of the first light guide plate 41 guides light provided by the first light source 31 toward the first area 11 and away from the second area 12. Therefore, when the second light source 32 is in a power-saving state, i.e. no data shown in the second area 12, the light provided by the first light source 31 is concentrated in the first area 11 without leaking to the second area 12.

It is noted that the first and the second light guide plates 41 and 42 can either be two separate units or be integrated into one. When they are integrated into one, by patterning the light guide plate, or more specifically, by forming patterned grooves in the surface of the light guide plate, the light paths toward the first area 11 and the second area 12 are respectively controlled. For example, a single light guide plate can have a first light guide region and a second light guide region respectively corresponding to the first area 11 and the second area 12. The second light guide region is adjacent to the first light guide region. The first light guide region has a light structure, which guides light toward the first area 11 and away from the second area 12. Moreover, the light guide structure of the first light guide region (or the first light guide plate) is designed in a direction that light provided by the first light source 31 is significantly concentrated in the first area 11 of the panel 10.

Figure 3:
FIG. 3 illustrates a cross-sectional view along line I-I' of FIG. 2.

FIG. 3 illustrates a cross-sectional view along line I-I' of FIG. 2. As shown in FIG. 3, the light guide structures 50 are in a groove shape, and the depth of a groove is proportional to the distance between the groove and the light source. In other words, the closer the groove is to the light source, the shallower the depth of the groove is. Moreover, the closer the groove is to the light source, the higher (straighter) the slope of the slanted surface is. It is noted that the groove is one exemplary type of the light guide structures, other possible structures can be implemented with the present invention to produce uniform light intensity, adjust light path, minimize light interference, and prevent light leak.

As shown in FIG. 2, the display apparatus 100 further includes a processor 60. According to image signal or display status of the panel 10, the processor 60 determines states of the first light source 31 and the second light source 32. The first light source 31 for illuminating the first area 11 can independently and selectively enters into a first state and a second state. The second light source 32 for illuminating the second area 32 can independently and selectively enters into a third state and a fourth state. The first state is different from the second state, and the third state is different from the fourth state. For example, the first state is an ON state, and the second state is an OFF state. The third state is an ON state, and the fourth state is an OFF state.

Moreover, the processor 60 can independently control the brightness level of the first and second light sources 31 and 32. For example, when the first light source 31 is in ON state, the first state can be an ON state of a first brightness level, and the second state is an ON state of a second brightness level. The first brightness level is different from the second brightness level. Similarly, when the second light source 32 is in ON state, the third state can be an ON state of a third brightness level, and the fourth state is an ON state of a fourth brightness level. The third brightness level is different from the fourth brightness level. It is noted that the processor 60 can determine states of the first and the second light sources 31 and 32 according to the display information.

For an LCD apparatus of a mobile phone, the first area 11 is configured to display first data 21 like general communication information, such as time, battery status, phone number, or communication status. The second area 12 is configured to display second data 22 like image information, such as received images, personalized graphics or texts. When the mobile phone is in a standby mode, the first light source 31 can be in ON state of a lower brightness level, and the second light source 32 can be in OFF state. Therefore, power can be conserved, and light provided by the first light source 31 is bright enough to show the communication information in the first area 11. When the action of inputting or checking information is performed, the second light source 32 can be in ON state of maximum brightness level, and the first light source 31 can remain in the standby state (lower brightness level) or be changed from the ON state of lower brightness level to ON state of a higher brightness level. Moreover, when the first area 11 and the second area 12 are together to display complicated information, the first and the second light sources 31 and 32 both are in the ON state of maximum brightness level to illuminate these two areas 11 and 12.

Furthermore, besides the mobile phone, the display apparatus 100 can be applied to other electronic devices, such as personal digital assistances, digital cameras, and the like. In this embodiment, though the panel 10 has two areas, the number of the display areas defined in a panel is not limited to 2. In response to different design needs, the panel can have two or more than two display areas.

As described above, the first light source 31 and the second light source 32 can be independently controlled in the OFF state or a lower brightness state so as to conserve power of the display apparatus.

Although specific embodiments have been illustrated and described, it will be obvious to those skilled in the art that various modifications may be made without departing from what is intended to be limited solely by the appended claims.

What is claimed is:

1. A display apparatus selectively operated in a first mode and a second mode, said display apparatus comprising;
   a unitary display panel having a viewer side and a back side, said viewer side divided into a first area and a second area, in response to an image signal, said first area and said second area configured to display variable data on said viewer side;
   a first light source for illuminating said first area from said back side; and
   a second light source for illuminating said second area from said back side;
   wherein said first area and said second area are illuminated with substantially same brightness by said first light source and said second light source simultaneously to make said first area and said second area having substantially same visually brightness on the viewer side when said display apparatus is operated in said first mode;

wherein said second light source is driven to a lower brightness level to make said second area visually darker than said first area on the viewer side when said display apparatus is operated in said second mode for conserving power of said display apparatus.

2. The display apparatus of claim 1, wherein said first light source and said second light source are both turned on when said display apparatus is operated in said first mode.

3. The display apparatus of claim 1, wherein said first light source is turned on and said second light source is turned off when said display apparatus is operated in said second mode.

4. The display apparatus of claim 1, wherein said first state is an ON state of a first brightness level, and said second state is an ON state of a second brightness level, said first brightness level is different from said second brightness level.

5. The display apparatus of claim 1, wherein said third state is an ON state of a third brightness level, and said fourth state is an ON state of a fourth brightness level, said third brightness level is different from said fourth brightness level.

6. The display apparatus of claim 1, further comprising a first light guide plate for reflecting and scattering light provided by said first light source so that light uniformly illuminates said first area.

7. The display apparatus of claim 6, wherein said first light guide plate further comprises a light guide structure for reflecting light provided by said first light source to said first area.

8. The display apparatus of claim 7, further comprising a second light guide plate for reflecting and scattering light provided by said second light source so that light uniformly illuminates said second area, wherein the first light guide plate and the second light guide plate are disposed side by side at the back side of the display panel.

9. The display apparatus of claim 8, wherein said second light guide plate further comprises grooves for guiding the light from the second light source away from said first light guide plate.

10. A display system, comprising;
an electronic device selectively operated in a first mode and a second mode;
a unitary display panel having a viewer side and a back side, said viewer side divided into a first area and a second area, in response to an image signal, said first area and said second area configured to display variable data on said viewer side;
a first light source for illuminating said first area from said back side;
a second light source for illuminating said second area from said back side; and
a processor for controlling said first light source and said second light source according to modes of said electronic device;
wherein said first light source and said second light source are driven to illuminate said first area and said second area simultaneously and to make said first area and said second area have substantially same visually brightness as each other when said electronic device is operated in said first mode, so that data for said first area and data for said second area are illuminated on said viewer side at the same time;
wherein said second light source is driven to generate light with lower brightness than said first light source to make said second area visually darker than said first area on the viewer side when said electronic device is operated in said second mode for conserving power of said display system.

11. The display system of claim 10, wherein said first light source and said second light source are both turned on when said electronic device is operated in said first mode.

12. The display system of claim 10, wherein said first light source is turned on and said second light source is turned off when said electronic device is operated in said second mode.

13. The display system of claim 10, wherein said first state is an ON state of a first brightness level, and said second state is an ON state of a second brightness level, said first brightness level is different from said second brightness level.

14. The display system of claim 10, wherein said third state is an ON state of a third brightness level, and said fourth state is an ON state of a fourth brightness level, said third brightness level is different from said fourth brightness level.

15. The display system of claim 10, further comprising a first light guide plate for reflecting and scattering light provided by said first light source, so that light uniformly illuminates said first area.

16. The display system of claim 15, wherein said first light guide plate further comprises a light guide structure for reflecting light provided by said first light source to said first area and away from said second area.

17. The display system of claim 10, further comprising a second light guide plate for reflecting and scattering light provided by said second light source, so that light uniformly illuminates said second area.

18. The display system of claim 17, wherein said second light guide plate further comprises a groove surface for reflecting light provided by said second light source to said second area.

19. A mobile device selectively operated in a first mode and a second mode, said mobile device comprising;
a unitary display panel having a viewer side and a back side, said viewer side being divided into a first area and a second area, in response to an image signal, said first area and said second area being configured to display variable data on said viewer side;
a first light source for illuminating said first area on said viewer side;
a second light source for illuminating said second area from said back side; and
a processor for controlling said first light source and said second light source according to modes of said mobile device;
wherein said first light source and said second light source are driven to illuminate said first area and said second area simultaneously and to make said first area and said second area have substantially same visually brightness as each other when said electronic device is operated in said first mode, so that data for said first area and data for said second area are illuminated on said viewer side at the same time;
wherein said second light source is driven to generate light with lower brightness than said first light source to make said second area visually darker than said first area on the viewer side when said electronic device is operated in said second mode for conserving power of said mobile device.

20. The mobile device of claim 19, wherein said mobile device comprises a mobile phone, a personal digital assistance, or a digital camera.

21. The display apparatus of claim 9, wherein the first light guide plate and the second light guide plate are two separate units or are integrated into one.

* * * * *